United States Patent [19]

Zitz et al.

[11] 4,225,144

[45] Sep. 30, 1980

[54] DEVICE FOR SEALING THE GAP BETWEEN COMPONENT PARTS ROTATABLE RELATIVE TO EACH OTHER

[75] Inventors: Alfred Zitz; Otto Schetina, both of Zeltweg; Peter Kogler, Knittelfeld, all of Austria

[73] Assignee: Vereinigte Osterreichische Eisen- und Stahlwerke-Alpine Montan Aktiengesellschaft, Vienna, Austria

[21] Appl. No.: 923,445

[22] Filed: Jul. 10, 1978

[30] Foreign Application Priority Data

Jul. 11, 1977 [AT] Austria .................................. 4968/77

[51] Int. Cl.³ .......................... F16J 15/32; F16J 15/40; F16J 15/44

[52] U.S. Cl. ........................................ 277/12; 277/53; 277/59; 277/74; 277/92; 277/152; 308/187.1; 175/372

[58] Field of Search ...................... 277/17, 19, 92, 94, 277/82, 152, 53, 59, 74, 12; 175/371, 372; 308/36.1, 187.1, 187.2

[56] References Cited

U.S. PATENT DOCUMENTS

| | | | |
|---|---|---|---|
| 2,757,052 | 7/1956 | Spurgeon | 308/187.1 |
| 2,810,592 | 10/1957 | Williams | 277/17 |
| 2,868,574 | 1/1959 | Rich | 277/152 X |
| 2,878,084 | 3/1959 | Bermingham | 277/94 X |
| 3,389,760 | 6/1968 | Morris | 175/371 |
| 3,419,093 | 12/1968 | Lichte et al. | 175/372 X |
| 3,572,857 | 3/1971 | Hasegawa | 277/94 X |
| 3,599,993 | 8/1971 | Ericksson | 277/59 |
| 3,612,197 | 10/1971 | Motoyama | 277/53 X |
| 3,934,311 | 1/1976 | Thompson | 177/59 X |
| 4,106,781 | 8/1978 | Benjamin et al. | 277/82 |

FOREIGN PATENT DOCUMENTS

| | | | |
|---|---|---|---|
| 811270 | 4/1959 | United Kingdom | 277/74 |
| 1407288 | 9/1975 | United Kingdom | 277/17 |

Primary Examiner—Robert S. Ward, Jr.
Attorney, Agent, or Firm—Cushman, Darby & Cushman

[57] ABSTRACT

A device for preventing penetration of dust from the outside inwardly into an annular gap between a cutter arm of a cutting machine and a rotatable cutting head carried on said arm, said cutting head having an interior space containing lubricating oil, said device comprising a first seal closing off said interior space and located in said gap, a second seal located in said gap outwardly of said first seal, the grease flow resistance of said second seal in the outward direction being less than the grease flow resistance of said first seal in an inward direction, and a pressurized grease supply line arranged within said cutter arm opening into said gap at a location between said first and second seals whereby during operation of the cutting head grease flows outwardly through said gap and prevents entry of dust into said gap.

5 Claims, 3 Drawing Figures

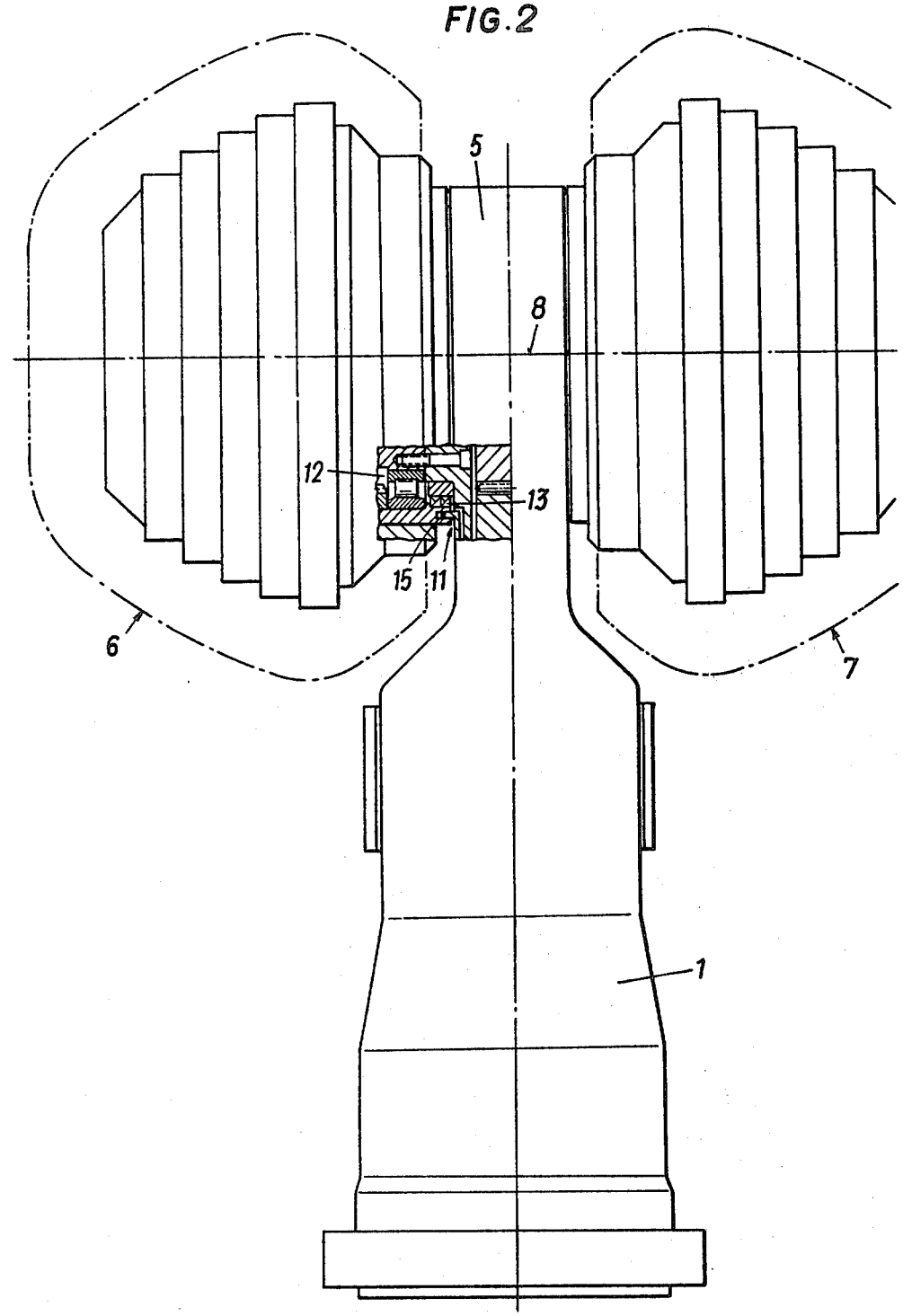

DEVICE FOR SEALING THE GAP BETWEEN COMPONENT PARTS ROTATABLE RELATIVE TO EACH OTHER

The invention refers to a device for sealing the gap between component parts rotatable relative to each other, said component parts enclosing an inner cavity which is closed in outward direction by means of a sealing element arranged within said gap. Severe sealing difficulties are encountered particularly in a dust-loaden atmosphere and particularly when even the smallest amount must be reliably prevented from entering said inner cavity. This is particularly true in a sealing device for rotating cutting heads rotatably supported within the cutting arm. When exploiting a mine face a considerable amount of dust is produced. The width of the sealing gap between the cutting head and the cutting arm is of considerable dimension and in view of the rough operating conditions dust cannot be prevented from entering through the sealing gap. Dust particles which have entered the sealing gap destroy the sealing during operation so that there exists the danger that dust also enters the inner cavity. A gearing is provided within said inner cavity and if dust particles are mixed with the lubricant oil of the gearing, the consequence is a premature wear.

The invention aims at avoiding the mentioned drawbacks and essentially consists in that an additional sealing element is arranged within the gap outwardly of the sealing element closing the inner cavity, in that a grease supply conduit connected to a pressurized grease source is opening into the gap space located between the sealing element closing the inner cavity and the additional sealing element and in that the flow resistance for the grease provided by the additional sealing element in outward direction is smaller than the flow resistance for the grease provided by the sealing element closing the inner cavity.

In view of the flow resistance for the grease provided by the additional sealing element in outward direction being smaller than the flow resistance provided by the sealing element closing the inner cavity, the grease supplied into the interspace between said both sealing elements will flow in outward direction. This flow of grease reliably prevents any dust from entering into the sealing gap and from reaching the sealing element closing the inner cavity. This effect can be attained with only a small amount of grease passing in outward direction through the additional sealing element, so that the amount of grease lost is only very small. If such a device is, according to a preferred embodiment of the invention, arranged between the cutting arm and the cutting head of a cutting machine, the required amount of grease can without further be branched off the lubricating system of the machine and the grease emerging from the sealing gap has no disturbing effect. In view of the main sealing being arranged between the gap space supplied with pressurized grease and the inner space— which can comprise, as for instance in cutting machines, a gearing equipped with a circulation-system lubrication—the grease can be prevented from entering the inner space and thus from deteriorating the lubricant oil. Thus, the grease supply for the gap space located between the main sealing and the additional sealing element is completely independent of the circulation-system lubrication.

According to the invention, the additional sealing element is preferably formed by a lip-seal, the lip of which is opening in outward flow direction. Thus, outward flow of the grease from the interspace between both sealing elements is facilitated and, in addition, dust particles present in the dust-loaden atmosphere are reliably prevented from entering this interspace in case of a transient failure of the pressurized grease source or a pressure drop. According to the invention, the additional sealing element can be formed of a labyrinth, noting that the long path through such a labyrinth prevents penetration of dust from the outer environment. According to a preferred embodiment of the invention, the lip-seal is provided in addition to the labyrinth and preferably in a middle portion of said labyrinth.

The invention is further illustrated with reference to the drawing, diagrammatically showing an embodiment.

FIG. 2 shows in a larger scale the forward portion of the cutting arm with the cutting head.

Figure 1:
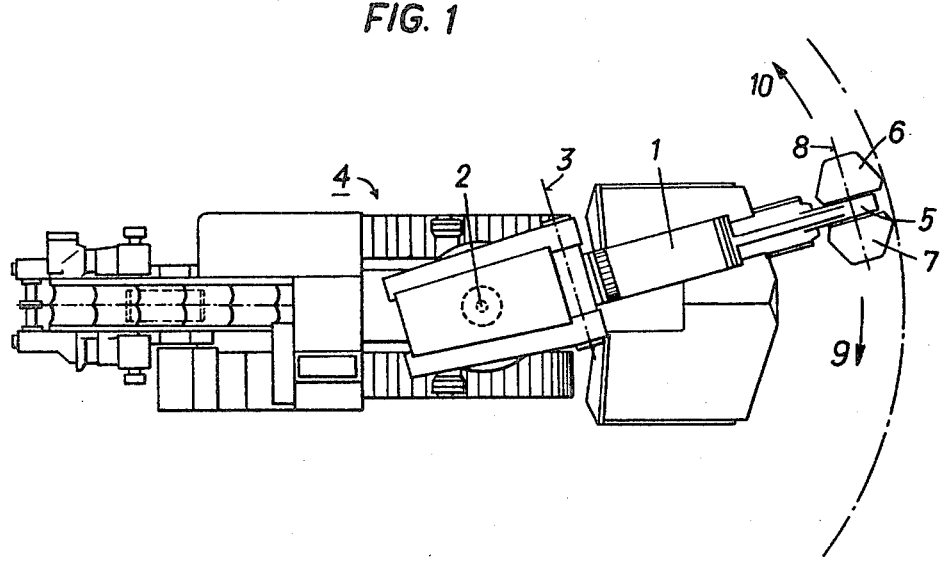
FIG. 1 is a top-plan view of a cutting machine.
Figure 3:
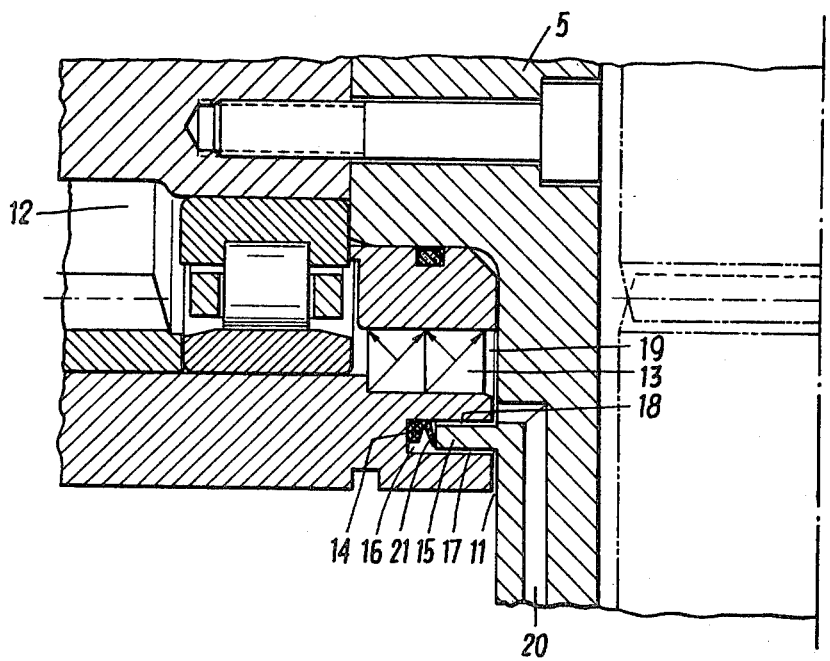
FIG. 3 shows in a still larger scale a detail of the sealing gap.

The cutting arm 1 is supported on the cutting machine 4 for being swivelled around a vertical axis 2 and around a horizontal axis 3. Two cutting heads 6 and 7 are supported at the forward end 5 of the cutting arm for being rotated around an axis 8. The cutting heads 6 and 7 are advanced in direction of arrows 9 and 10. The cutting heads are operated immediately at the mine face so that the sealing provided between the end 5 of the cutting arm and the rotating cutting heads is subjected to the influence of an intense dust cloud. As is shown in FIG. 2, the width of the sealing gap 11 is considerable.

The cutting heads 6 and 7 are hollow and accommodate within their inner cavities 12 a planet gearing as the last unit of a step-down gearing. Therefore, it is important that no dust whatsoever can enter into this inner cavity. The inner cavity 12 is sealed in outward direction by sealing elements 13. An additional sealing element is formed by a lip-seal 14. A ring 15 protruding from the forward portion 5 of the cutting arm is engaging an annular groove 16 of the cutting head 6, noting that at both sides of said protruding ring annular spaces 17 and 18 are kept free which act in the manner of a labyrinth.

A pressurized grease conduit 20 opens into the space 19 located between the sealing elements 13 and the additional sealing provided by the sealing element 14 and the labyrinth gaps 18 and 17. This pressurized grease conduit 20 is formed by bores provided in the wall of the cutting arm and is connected to a grease pump or grease press, respectively. The sealing lip 21 is arranged in such a direction that the grease is facilitated to emerge in outward direction via the labyrinth gaps 18 and 17 so that the dust is in any case prevented from entering the inner space 12 and dust particles, if any, having entered the sealing gap 11, will be transported in outward direction.

What we claim is:

1. A device for preventing penetration of dust from the outside inwardly into an annular gap between a cutter arm of a cutting machine and a rotatable cutting head carried on said arm, said cutting head having an interior space containing lubricating oil, said device comprising a first seal closing off said interior space and located in said gap, a second seal located in said gap outwardly of said first seal, the grease flow resistance of said second seal in the outward direction being less than the grease flow resistance of said first seal in an inward direction, and a pressurized grease supply line arranged within said cutter arm opening into said gap at a location between said first and second seals whereby during operation of the cutting head grease flows outwardly through said gap and prevents entry of dust into said gap.

2. A device as in claim 1 wherein said second seal includes a lip-seal having a lip which opens in the outward direction.

3. A device as in claim 1 wherein said second seal includes a labyrinth seal.

4. A device as in claim 1 wherein said second seal includes a lip seal and a labyrinth seal having at least two passages, said lip seal being located between said passages and having a lip which opens in the outward direction.

5. A device as in claim 1 wherein there is a bearing between the cutting head and the cutter arm, said bearing being located in said interior space.

* * * * *